(12) United States Patent
Gates et al.

(10) Patent No.: US 7,379,654 B2
(45) Date of Patent: May 27, 2008

(54) PROGRAMMABLE VIDEO RECORDER BACKING STORE FOR NON-BYTE STREAM FORMATS

(75) Inventors: Matthijs Arjan Gates, Seattle, WA (US); Philippe Ferriere, Redmond, WA (US); Jai Srinivasan, Kirkland, WA (US); Mukund Sankaranarayan, Sammamish, WA (US); Alok Chakrabarti, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1183 days.

(21) Appl. No.: 10/175,208

(22) Filed: Jun. 19, 2002

(65) Prior Publication Data

US 2003/0235391 A1 Dec. 25, 2003

(51) Int. Cl.
*H04N 7/00* (2006.01)
*H04N 9/79* (2006.01)
*H04N 5/94* (2006.01)
*H04N 7/26* (2006.01)
*H04N 5/76* (2006.01)
*H04N 7/173* (2006.01)
*G11B 27/00* (2006.01)

(52) U.S. Cl. .............. 386/46; 386/4; 386/40; 386/48; 386/52; 386/112; 369/60.01; 348/513; 348/714; 725/89; 725/134; 725/142

(58) Field of Classification Search ............... 386/4, 386/33, 40, 45, 46, 48, 52, 68, 83, 92, 105, 386/106, 109, 112, 125, 126; 369/60.01; 348/512, 513, 571, 714; 725/48, 39, 55, 725/56, 92, 89, 134, 142; 525/115
See application file for complete search history.

(56) References Cited

U.S. PATENT DOCUMENTS

| | | | |
|---|---|---|---|
| 6,233,389 B1 * | 5/2001 | Barton et al. | 386/46 |
| 6,480,667 B1 * | 11/2002 | O'Connor | 386/83 |
| 6,678,463 B1 * | 1/2004 | Pierre et al. | 386/83 |
| 6,788,882 B1 * | 9/2004 | Geer et al. | 386/116 |
| 2002/0037160 A1 * | 3/2002 | Locket et al. | 386/111 |
| 2002/0069218 A1 * | 6/2002 | Sull et al. | 707/501.1 |
| 2002/0114360 A1 * | 8/2002 | Perlman | 370/536 |
| 2003/0110504 A1 * | 6/2003 | Plourde et al. | 725/89 |

OTHER PUBLICATIONS

FDDI and BWN Backbone Networks: A Performance Comparison Based on Simulation, T. Welzel, Eighth Annual International Phoenix Conference on Computers and Communications. 1989 Conference Proceedings (Cat. No. 89CH2713-6), U.S.A., 1989, XIX+641, pp. 190-4.

* cited by examiner

Primary Examiner—Thai Q. Tran
Assistant Examiner—Syed Y. Hasan
(74) Attorney, Agent, or Firm—Workman Nydegger

(57) ABSTRACT

The buffer of a programmable video recorder includes a backing store having a plurality of discrete temporary files that are configured to store non-byte streamed data, such as ASF data. The data stream includes a number of data samples that are each assigned a time stamp upon receipt. Each data sample is then assigned and written to a temporary file based on a corresponding duration assigned to each of the temporary files. The backing store operates like a moving window as the oldest temporary files are replaced with the newest temporary files.

47 Claims, 9 Drawing Sheets

PROGRAMMABLE VIDEO RECORDER BACKING STORE FOR NON-BYTE STREAM FORMATS

BACKGROUND OF THE INVENTION

1. The Field of the Invention

The present invention is directed to methods for buffering streaming data and, more particularly, to methods for enabling a device such as a programmable video recorder (PVR) to write and read non-byte streamed data in a backing store.

2. Related Technology

There are a variety of devices that have been developed throughout the years for increasing the convenience of watching and listening to broadcast data in a "time-shifted" manner. In other words, the broadcast data is displayed at a different time than it is received. The videocassette recorder (VCR), for example, is one such device. The VCR generally enables the viewer to record a broadcast and then later watch the broadcast at the viewer's leisure. The viewer can, for instance, use the VCR to selectively fast-forward, rewind, pause and replay the recording of the broadcast in a time-shifted manner.

One limitation of the traditional VCR, however, is that it cannot fast-forward, rewind, pause and replay the recorded broadcast while simultaneously recording a new broadcast. The primary reason for this is that the VCR cannot simultaneously write to and read from a videocassette. Another problem with the traditional VCR is that it is limited in its ability to access and provide the recorded data to the viewer in an expeditious manner. In particular, the speed at which the VCR can seek and obtain desired data is limited to the speed at which the VCR can fast-forward and rewind the videocassette containing the desired data.

The advent of broadcasting data in digital and streaming formats has allowed for many conveniences not considered practical for the VCR. For instance, digital data can be recorded and indexed on a hard disk or another type of mass storage device, thereby enabling the recorded data to be accessed promptly, without requiring the storage medium to be fast-forwarded and rewound in the sequential and time-consuming manner that is required for videocassettes. Another general benefit provided by digital data is that writing and reading digital data to a storage medium can occur simultaneously, such that the viewer can access previously recorded data without interrupting the recording of the new data. One drawback of digital data, however, is that it is file based, such that data within a file typically cannot be accessed and used until the entire contents of the file have been received.

Recently, however, certain standards have been developed which enable file based data to be encoded in a streaming format, such that the streamed data can be accessed and read at the same time it is being received, and without first requiring the entire contents of the streamed data file to be received. There are various standards and formats for streaming data. They include, but are not limited to, MPEG (Moving Picture Experts Group), ASF (Advanced Streaming Format), and AVI (Audio Video Interleave).

The programmable video recorder (PVR), or digital video recorder (DVR), is an example of one device that utilizes the benefits of digital data and which is capable of reading (and thus rendering) streamed data while it is being received. Nevertheless, there are many circumstances in which the PVR will store the streamed data for future use, rather than rendering the data at the rate or time it is received. For example, the streamed data may be received by the PVR at a faster rate than the PVR is capable of reading the streamed data. The PVR can also be directed by the viewer to intentionally read other data rather than the most recently received streamed data. For example, the viewer watching a program may wish to replay a previous event in the program, in which case the PVR is used to access and replay the previous event, during which time the reader is unable to read the most recently received streamed data. In yet another example, the viewer can use the PVR to temporarily pause the display of the program, during which time the reader is prohibited from reading, processing and rendering the streamed data altogether.

At any time in which the reader fails to read the streamed data at the rate it is received, the writer must store the streamed data so that it can be accessed and read at a later time. Otherwise, the data will be lost and inaccessible to the viewer later. Accordingly, in order to avoid losing data, existing PVR devices are configured with a ring buffer that is capable of temporarily storing the data until it is read. The ring buffer also temporarily stores data after it has been read, thereby enabling the viewer to quickly rewind and view previous events in the program.

FIG. 1 illustrates one example of an existing ring buffer 10 used by existing PVR devices to store streamed data. The ring buffer 10 essentially comprises memory disk storage that is accessed by a writer 20 and a reader 30 associated with the PVR. As illustrated in FIG. 1, streamed data 40 comprising data samples D1 thru D13 and so forth, which are (or will be) received by the writer 20 for writing to the ring buffer 10. In the illustrated example of FIG. 1, the data samples D1 thru D10 have been written in that order to the ring buffer 10, while data samples D11 thru D13 have not yet been written. Typically, the data is written to the ring buffer 10 in the order it is received. Once the streamed data 40 is written to the ring buffer 10, it is accessible to be read by the reader 30.

As mentioned above, there are certain circumstances, both intentional and unintentional, in which the streamed data 40 is received much more quickly than the reader 30 can read and render the streamed data 40. In these circumstances the writer 20 continues to write the streamed data 40 to the ring buffer 10 until the finite capacity of the ring buffer 10 is reached. Once the buffer 10 is completely full, the writer 20 must overwrite existing data or else the most recently received data will be lost. The most practical and common approach is to overwrite the oldest data samples contained within the ring buffer 10 so as to avoid losing the most recently received data samples. To illustrate this approach, FIG. 2 illustrates streamed data 40 as including data samples D3 through D21 and so forth, and represents that the writer 20 has also received data samples D11 through D18. Note that data sample D17 has overwritten data sample D1, data sample D18 has overwritten data sample D2, and data sample D19 will overwrite data sample D3, and so forth.

The utility of being able to independently and simultaneously write and read streamed data in a storage medium, such as ring buffer 10, provides the PVR a significant advantage over the traditional VCR. For example, the PVR enables a viewer to rewind and watch a replay of a previous event in a program, while at the same time the program continues to be broadcast, received and written to the ring buffer 10. In this manner, the PVR enables the viewer to later resume watching the program in a time-shifted manner, as desired, including the portions of the program that were broadcast and recorded during the time in which the viewer was watching the replay.

Despite the aforementioned benefits provided by the ring buffer 10, the ring buffer 10 has one significant disadvantage, which correspondingly limits the utility of the PVR. In particular, the ring buffer 10 can only support certain types of streamed data formats, such as MPEG, which can be wrapped in the manner described above in reference to FIGS. 1 and 2. In certain embodiments, MPEG refers to MPEG-2. However, it will be appreciated that the invention is not limited to embodiments in which MPEG is limited to MPEG-2.

Streamed data formats that cannot be wrapped include, but are not limited to, ASF and other non-byte stream formats. ASF, which is well-known to those of ordinary skill in the art, is a non-byte stream format provided by Microsoft Corporation that supports data delivery over a wide variety of networks and protocols while still proving suitable for local playback. ASF supports advanced multimedia capabilities including extensible media types, component download, scaleable media types, author-specified stream prioritization, multiple language support, and extensive bibliographic capabilities, including document and content management. It will be appreciated, however, that the invention is not limited to buffering ASF formatted data or any other particular type of non-byte stream formatted data.

One reason why non-byte stream formats cannot be wrapped is because doing so will corrupt or make inaccessible all of the previously recorded data even if the data was not overwritten in the file. For example, with reference to FIGS. 1 and 2, if streamed data 40 comprised an ASF format and data sample D1 included header information corresponding to the streamed data 40, once data sample D17 replaced data sample D1, the data samples of the streamed data 40 within the ring buffer 10 would be unreadable and essentially inaccessible to the reader 30, thereby frustrating the purposes for which the ring buffer 10 was established, namely, to store the streamed data 40 so it could be read at a later time. Accordingly, the utility of the PVR is limited inasmuch as ring buffers are unable to utilize streamed data that is formatted in non-byte stream formats.

Yet another problem experienced by the PVR is that the typical format of streamed data used by the PVR (e.g. MPEG) is compressed non-linearly with respect to time. For example, the first ten seconds of a program encoded in an MPEG format may comprise two megabytes, whereas the next ten seconds of the program may comprise three megabytes. This is a problem because the streamed data fills the buffer based on byte size, rather than on duration of content, thereby making it difficult for the PVR to know exactly where content having a particular time is located within the buffer.

For example, a viewer may wish to rewind the program five minutes. However, the PVR is only capable of rewinding the program by approximately five minutes because the rewind function is based on skipping over a block of data having a byte size that approximately corresponds to five minutes worth of content. However, because the actual byte size of the content that is skipped over is only approximate, the rewind function will also be only approximate.

BRIEF SUMMARY OF THE INVENTION

The present invention is directed to improved methods for buffering streaming data in a backing store and, in particular, to buffering streamed data that is formatted with a non-byte stream format such as ASF into a backing store that includes a plurality of discrete files.

According to one aspect of the invention, streamed data that includes a plurality of data samples formatted in a non-byte stream file format is received by a computing system that includes a storage medium and a processor. According to the invention, the processor configures a portion of the storage medium into a temporary backing store having a plurality of temporary files for storing the streamed data as it is received.

Prior to receiving the streamed data, the computing system specifies a window in the backing store that is defined by a total number of files permitted to be used in the backing store. Each of the temporary files, upon being opened, is configured to utilize a standard file format that is independent of any file format otherwise dictated by the streamed data. Each temporary file, upon being opened, is also assigned a specified duration of the streamed data content the temporary file is permitted to hold, rather than specifying the size of temporary file in terms of byte size.

Upon receiving the streamed data, the computing system assigns a time stamp to each newly received data sample of the streamed data. When the time stamp of a new data sample corresponds to an open temporary file, then the new data sample is written to the appropriate temporary file. When the time stamp of the new data sample does not correspond to an open temporary file then a new temporary file is opened, unless the total number files permitted in the backing store are already open, in which case, the oldest temporary file is overwritten with a new temporary file. The data sample is then written to the appropriate temporary file. It will be appreciated that in this manner the methods of the invention enable non-byte streamed data to be buffered in the backing store of a programmable video recorder.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention extends to both methods and systems for buffering streamed data in the backing store of devices that are configured to enable time-shifting play of streamed data, including the programmable video recorder (PVR). According to one aspect of the invention, streamed data is stored within a plurality of discrete files within a backing store of the PVR. The streamed data includes a plurality of data samples that are each assigned a time stamp and stored within the appropriate files of the backing store. Once the backing store is filled, new files, which are written to store newly received data, overwrite the oldest files in the backing store. As described herein, the present invention enables the PVR to store a broad range of non-byte stream formatted data, such as ASF data.

The embodiments of the present invention may comprise a special purpose or general-purpose computer including various computer hardware, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 3:
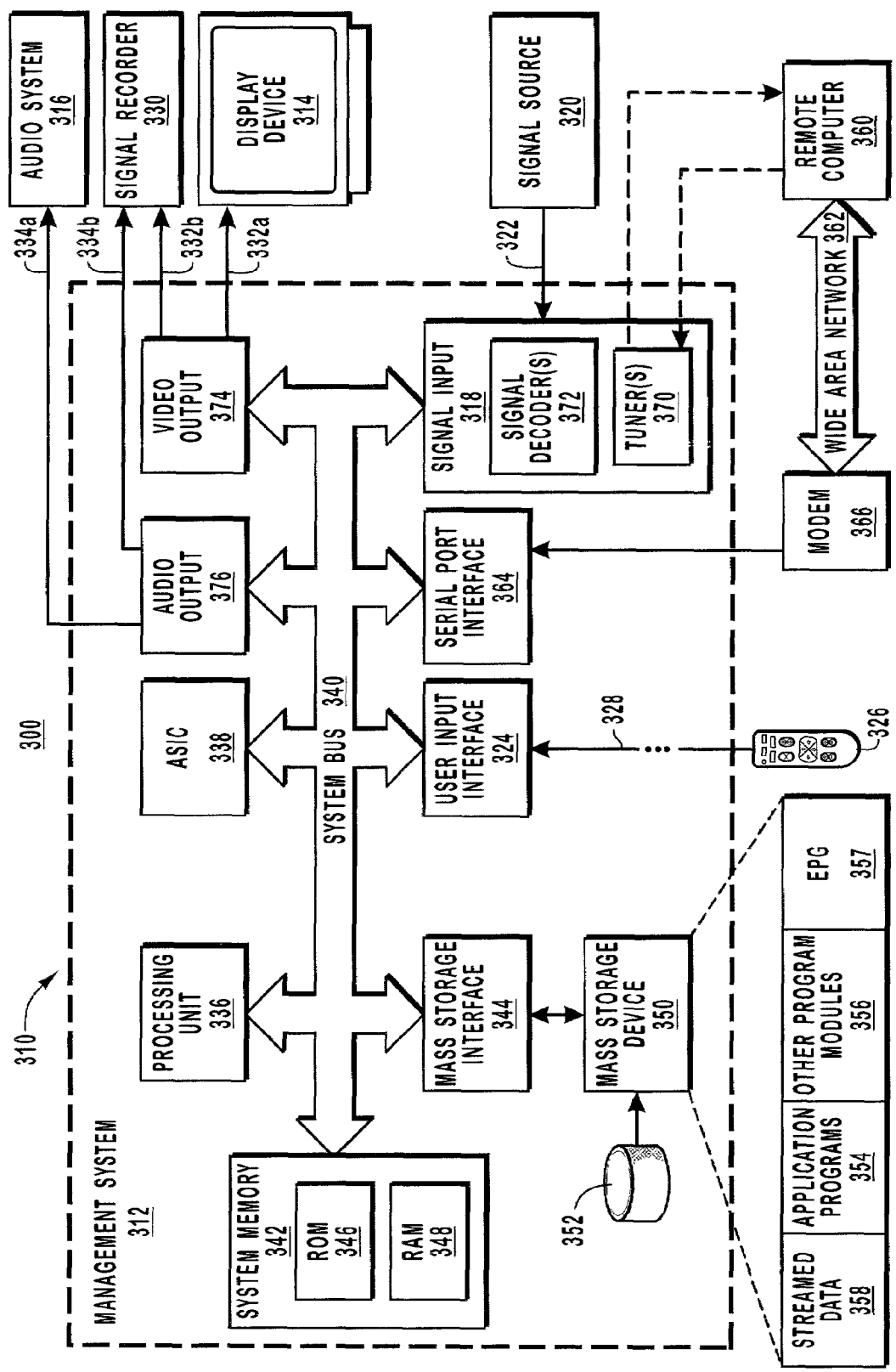
FIG. 3 illustrates one suitable network environment for practicing the methods of the invention.

FIG. 3 and the corresponding discussion provide a general description of a network 300 in which the present invention may operate. In one embodiment, the present invention is implemented in a network 300 that uses a conventional television screen or other display unit to display information and includes a programmable video recorder (PVR), digital video recorder (DVR) or a similar device that has been adapted to perform the operations that include receiving, writing, and reading streamed data so that it can be rendered in some desired manner. Streamed data includes digital data that has been formatted in such a manner that it can be accessed and rendered while it is being received, without having to first receive the entire contents of the streamed data. Streamed data may include, but is not limited to, audio, video, meta-data, IP data, markers and events.

FIG. 3 illustrates a home entertainment system 310 that includes a management system 312, a display device 314 and an audio system 316. Management system 312 may be a PVR that has been adapted to perform the operations disclosed herein. Management system 312 may be integrally positioned with or separate from display device 314, which may be a high definition television display, a standard television display, a flat panel display, a projection device, a high definition television display, a computer monitor, or any other device capable of displaying viewable video image data. Audio system 316 may be a speaker, a stereo system, or any device capable of emitting sound data, and similarly may be integrally positioned with or separate from display device 314.

Management system 312 includes a signal input 318, which receives streamed data from a signal source 320. The streamed data is transmitted from signal source 320 to signal input 318 via an input line 322, which can be a cable or optic connection, a terrestrial antenna system, a satellite system, or any device or system capable of transmitting streamed data to management system 312.

The signal source 320 may be either a single channel signal source or a multiple channel signal source. A single channel signal source provides programming from a recorded medium, such as a videocassette, compact disc, etc. Examples of a single channel signal source include a VCR, a DVD, and the like. Alternatively, a multiple channel signal source includes any system or device that is capable of sending a signal that may be received by a satellite receiver, a cable or optic connection, a terrestrial antenna, or the like. Examples of a multiple channel signal source include DSS/DVB, a cable box, locally broadcast programming (i.e. programming broadcast using UHF, VHF, or ATVEF), and the like.

While FIG. 3 illustrates home entertainment system 310 as having a single programming input line 322 and a single signal source 320, there can instead be a plurality of programming input lines that transmit programming from a plurality of signal sources. In such embodiments, the home entertainment system 310 may receive the streamed data from one signal source or from a plurality of signal sources at a time.

Management system 312 also includes a user input interface 324, which receives input from an input device 326, such as a remote control, keyboard, microphone, or any other device capable of generating electronic instructions for management system 312. Input device 326 is communicatively coupled to management system 312 over an input link 328 so as to enable such control. Input device 326 generates electronic instructions over input link 328 in response to preprogrammed data or in response to a viewer pressing buttons on input device 326. Input device 326 may also control Web browser software within management system 312 as when the management system 312 receives streamed data through an Internet connection.

FIG. 3 further illustrates a signal recorder 330, which is capable of receiving streamed data, including streamed video and audio data, and which is further capable of recording the streamed data on a storage medium associated with the management system 312. Video signals are transmitted to signal recorder 330 and display device 314 by video image links 332b and 332a, respectively, examples of which include a radio-frequency ("RF") link, an S-video link, a composite link, or any other equivalent form of video image link. Similarly, audio links 334a and 334b transmit audio data from management system 312 to audio system 316 and to signal recorder 330, respectively.

The operation of management system 312 is controlled by a central processing unit ("CPU"), illustrated as processing unit 336, which is coupled to an application-specific integrated circuit ("ASIC") 338 and uses computer-executable instructions implemented in software and/or hardwired logic circuitry. Processing unit 336 and ASIC 338 are coupled via a system bus 340, which also interconnects various other system components, such as the system memory 342, mass storage interface 344, user interface 324 and signal input 318. Processing unit 336 executes software designed to implement features of management system 312 including features of the present invention. ASIC 338 contains circuitry that is used to implement certain functions of management system 312. Instructions, data, and other software necessary for the operation of processing unit 336 and ASIC 338 may be stored in the system memory 342, such as in read-only memory ("ROM") 346 and/or in random-access memory ("RAM") 348, and/or in a mass storage device 350, which is coupled to mass storage interface 344. ROM 346, RAM 348 and mass storage device 350 are communicatively coupled to ASIC 338 so as to be readable by ASIC 338 and so that data may be written from ASIC 338 to RAM 348 and possibly mass storage device 350.

Mass storage device 350 may be a magnetic hard disk 352 or any other magnetic or optical mass memory device that is capable of storing large amounts of data. Any desired computer-readable instructions or data, including application programs 354, other program modules 356, and an electronic programming guide ("EPG") 357, which specifies the broadcast times and channels of programs can be stored in mass storage device 350. Mass storage device 350 can also be used to record streamed data 358, including multimedia data and non-multimedia data. Examples of multimedia data include audio data and video data. Examples of non-multimedia data include meta-data, markers, events, and IP data.

In the embodiment where management system 312 receives streamed data from the Internet, management system 312 communicates with a remote computer 360 via a wide area network ("WAN") 362 by including a serial port interface 364 that is interposed between the system bus 340 and a modem 366, a wireless link, or other means for establishing communications over a WAN that may be internal or external to management system 312. Management device 312 is also capable of transmitting information and receiving streamed data via the Internet by direct-dial communication over standard telephone lines, or by using any other available communication medium.

Referring now to signal input 318, if the signal on programming input line 322 includes multiple channels that are each receiving different streams of data, a tuner 370 included in signal input 318 tunes to a selected channel in the signal. Multiple tuners 370 can be used to provide enhanced features, such as recording streamed data from one channel while viewing streamed data on another channel, and recording streamed data from a plurality of channels simultaneously. A signal decoder 372 converts video data from an analog format to a digital format, or from a digital format to an analog format, in the event that ASIC 338 and tuner 370 employ different formats. Signal decoder 372 can also decode, decompress, and split audio, video, meta and other data from a compressed stream format (e.g. MPEG, ASF). In embodiments where the management system 312 includes multiple tuners 370, management system 312 may also include multiple signal decoders 372 to perform the operations disclosed herein. Management system 312 also includes a video output 374 and an audio output 376.

While FIG. 3 and the corresponding discussion above provide a general description of a suitable environment in which the invention may be implemented, it will be appreciated that the features of the present invention disclosed herein may be practiced in association with a variety of different system configurations.

Figure 4:
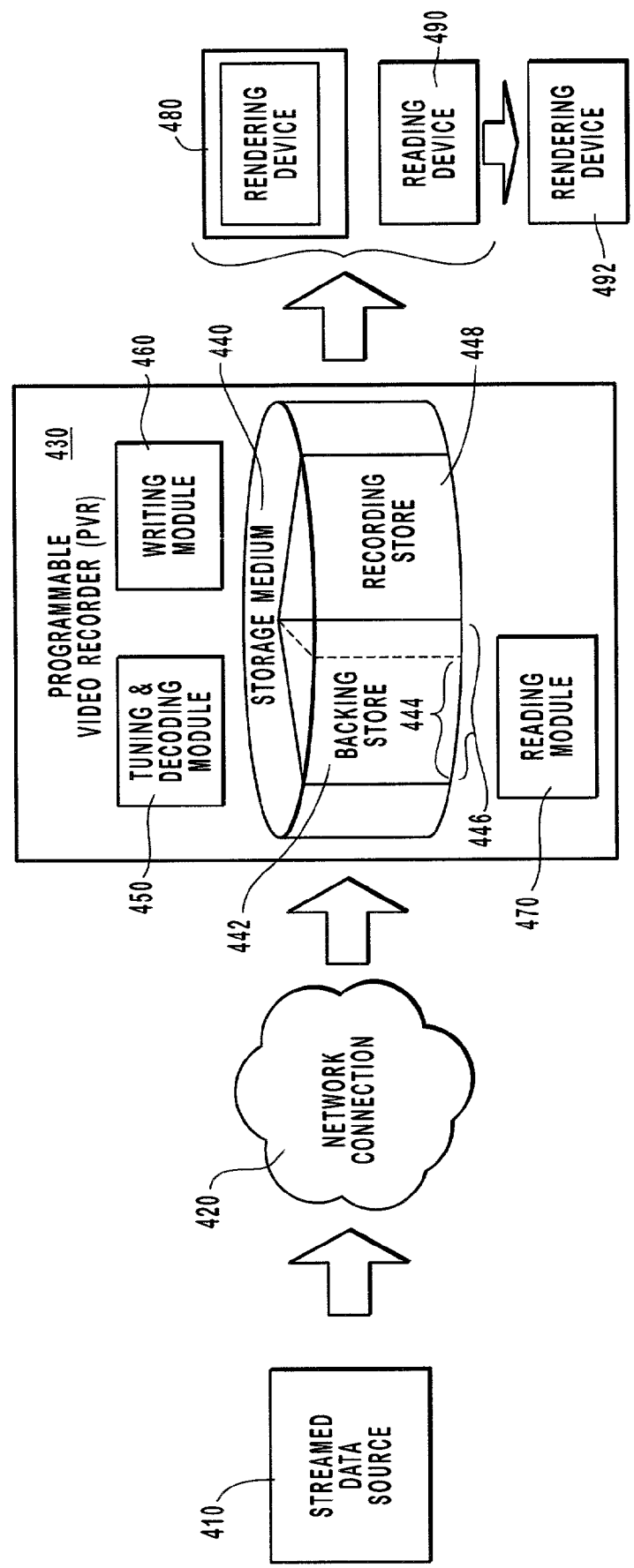
FIG. 4 illustrates a programmable video recorder that includes a storage medium and a plurality of modules for performing methods of buffering streamed data in accordance with the present invention.

FIG. 4 illustrates one suitable environment for practicing the methods of the invention. As shown, a streamed data source 410 transmits streamed data to the programmable video recorder (PVR) 430 through a network connection 420. The streamed data source 410 can include a single channel signal source or a multiple signal source, as described above. It will be appreciated that the connection between the streamed data source 410 and the PVR 430 can be any suitable connection, including cable and optic connections, terrestrial antenna systems, satellite systems, the Internet and any other device or system capable of transmitting streamed data to PVR 430.

PVR 430 includes a storage medium 440 and a plurality of modules 450, 460 and 470 for implementing the methods of the invention, as disclosed herein. The storage medium 440 generally includes a backing store 442 for buffering streamed data into temporary files. As shown, the backing store of the storage medium 440 may be configured with a lower capacity limit 444 and an upper capacity limit 446, as described below, for enabling certain embodiments of the invention. The storage medium 440 may also include a recording store 448 for archiving selected portions of the streamed data at the viewer's discretion into permanent files. In embodiments that include a recording store 448, the backing store 442 and the recording store 448 together comprise a PVR store that is capable of storing temporary and permanent files, as described herein. Each of the backing store 442 and the recording store 448 can include different portions of a single mass storage device or independent mass storage devices. Accordingly, although the recording store 448 is shown to be included with the backing store 442, within storage medium 440, it will be appreciated that recording store 448 can also be contained within one or more independent mass storage devices that are located locally or remotely of the PVR 430, and which are in communication with the PVR 430.

The tuning and decoding module 450 generally receives the streamed data, and when necessary, the tuning and decoding module 450 split the streamed data into different signals, such as audio and video signals. The tuning and decoding module 450 is not limited to receiving broadcast signals, but can also be considered a receiving module for receiving streamed data through the Internet, another network connection, or any other source capable of streaming data such as a file source. Decompression and de-multiplexing of the streamed data is also performed by the tuning and decoding module 450, when necessary.

The writing module 460 generally writes the streamed data to the storage medium 440, to the appropriate one of the backing store 442 and recording store 448, so that the streamed data can be accessed and rendered at a later time, at the viewer's discretion. The writing module 460 can also write streamed data to the backing store 442 and the recording store 448 at substantially the same time. It will be appreciated that the streamed data that is written to the backing store 442 and the recording store 448 may be the same streamed data or different streamed data (e.g., different streams of data or different portions of the same data stream).

The reading module 470 generally accesses and reads streamed data from the backing store 442 and the recording store 448 when directed by the viewer such as, for example, when the viewer watches a previously recorded program or alters the sequence in which a 'live' program is displayed. The term 'live' in this context refers to the time in which the program is received by the PVR 430 as streamed data. Accordingly, the reading module 470 is invoked whenever the viewer uses the PVR 430 to rewind or otherwise causes the streamed data to be displayed at a different time in which it is received by the PVR 430. The reading module 470 is also used to read 'live' data from the PVR store at substantially the same time the data is being received by the PVR 430. For instance, once the data is received and written to the PVR store by the writing module 460, the reading module 470 can immediately read the recorded data from the PVR store.

The reading module 470 is also capable of decompressing and splitting the streamed data into appropriate signals to be rendered by a rendering device 480 associated with the PVR, such as, for example, a television, a monitor, an audio system, and other similar rendering devices. The reading module 470 can also access and transmit streamed data from the storage medium 440 to a remote reading device 490, such as a remote computing device, which is capable of decompressing the streamed data into an appropriate signal that is ultimately transmitted to a rendering device 492 capable of rendering the streamed data or otherwise processed and archived or distributed. Accordingly, decompression may correspondingly occur either within the PVR or outside of the PVR.

Figure 5:
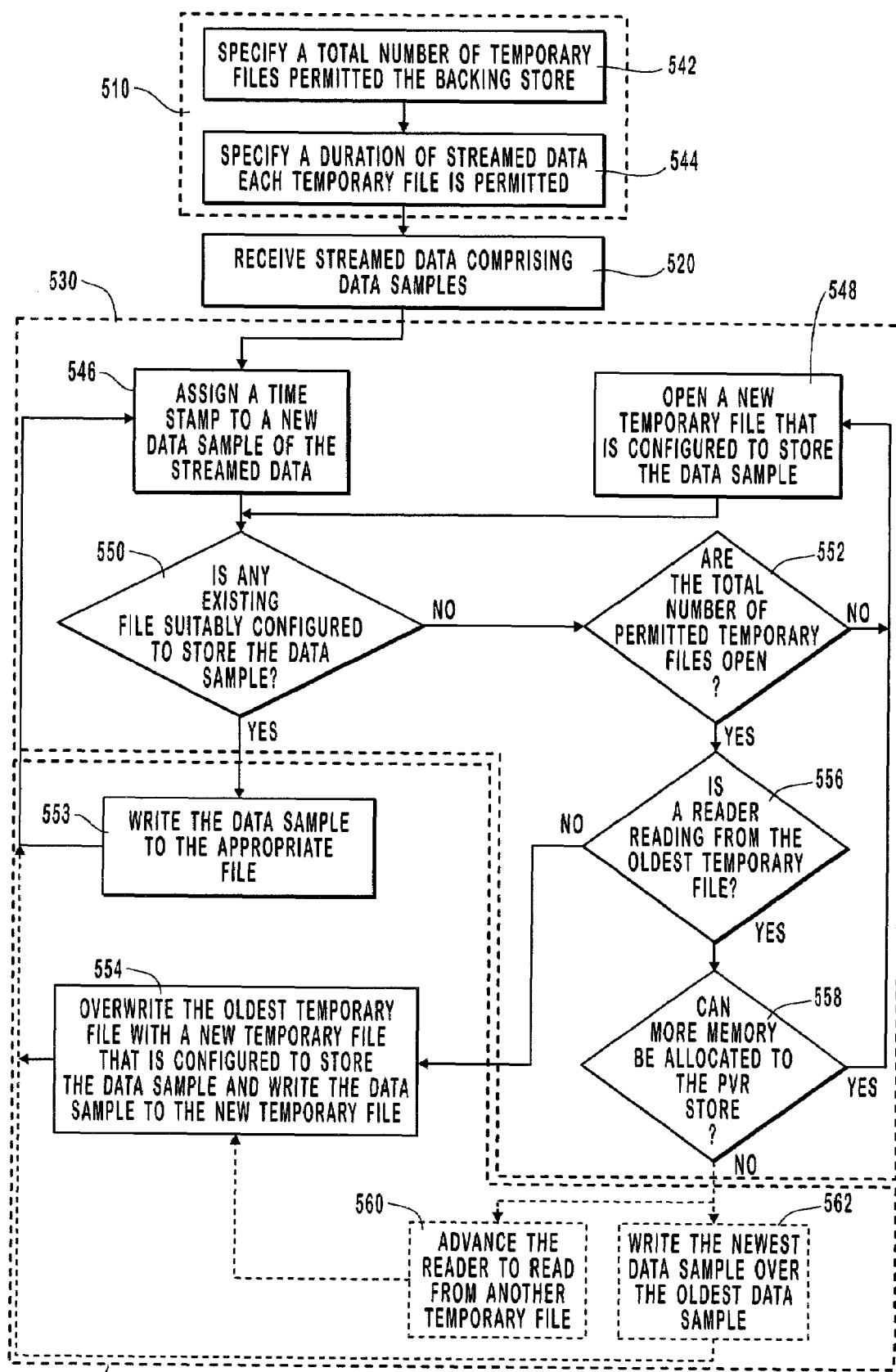
FIG. 5 illustrates a flow chart of a specific method for buffering streamed data in a backing store of a programmable video recorder in accordance with the present invention.

FIG. 5 illustrates one embodiment for configuring the PVR store as a moving window so that the streamed data is capable of being stored in a file format independent of any particular file format otherwise dictated by the streamed data as received. This is useful, as generally described herein, for enabling non-byte streamed data, such as ASF formatted data, to be buffered in a PVR device. As shown, the invention generally includes a step for creating the PVR store (step 510), the act of receiving streamed data (act 520), a step for determining where the streamed data is to be written (step 530), and a step for writing the streamed data to the appropriate storage location (step 540). Each of these steps and corresponding acts will now be described in detail with specific reference to FIGS. 6-9.

Initially, the step for creating the PVR store (step 510) includes the corresponding act of specifying a total number of temporary files that are permitted in the backing store (act 542) and the corresponding act of specifying the duration of streamed data each temporary file is permitted (act 544). The act of specifying the duration of streamed data also applies to permanent files that are created in the recording store. It will be appreciated that by specifying the duration of streamed data each file is permitted, rather than specifying the byte size of each file, the PVR is able to know exactly how much content is contained within each of the files, rather than being limited to knowing only the byte size of each file. As described below, this generally enables the PVR to precisely seek recorded content based on time rather than approximate byte size. It will also be appreciated that duration specified for permanent files that are created in the recording store corresponds to the length of the program being recorded and, consequently, the duration of a permanent file may differ from the duration of temporary files and other permanent files.

According to one embodiment, the act of specifying a total number of temporary files (act 542) is performed during manufacture of the PVR, such that the total number of temporary files is a default number established within the PVR at the time of manufacture. According to another embodiment, the total number of temporary files permitted by the PVR may also be changed according to user input that is received at the PVR at any time after the act of initially specifying the total number of temporary files (act 542) has been performed. For instance, user input may be received which overrides the default number of files set at manufacture.

According to one embodiment, the duration of content assigned to each file is sequentially assigned to the files as they are opened, such that the files sequentially stream together the content of the streamed data. For example, if a first file is assigned the first ten minutes of content then the next file will be assigned a duration of content beginning at the ten minute mark, where the first file ends. The duration of streamed content each temporary file can contain can be varied to accommodate different needs and preferences. For example, the duration may be limited to five minutes, ten minutes, twenty minutes, or any other duration. Although smaller durations are sometimes preferable for minimizing how much data is lost at any given time when the temporary files are overwritten, as described below, it will be appreciated that the durations are not necessarily small.

Figure 6:
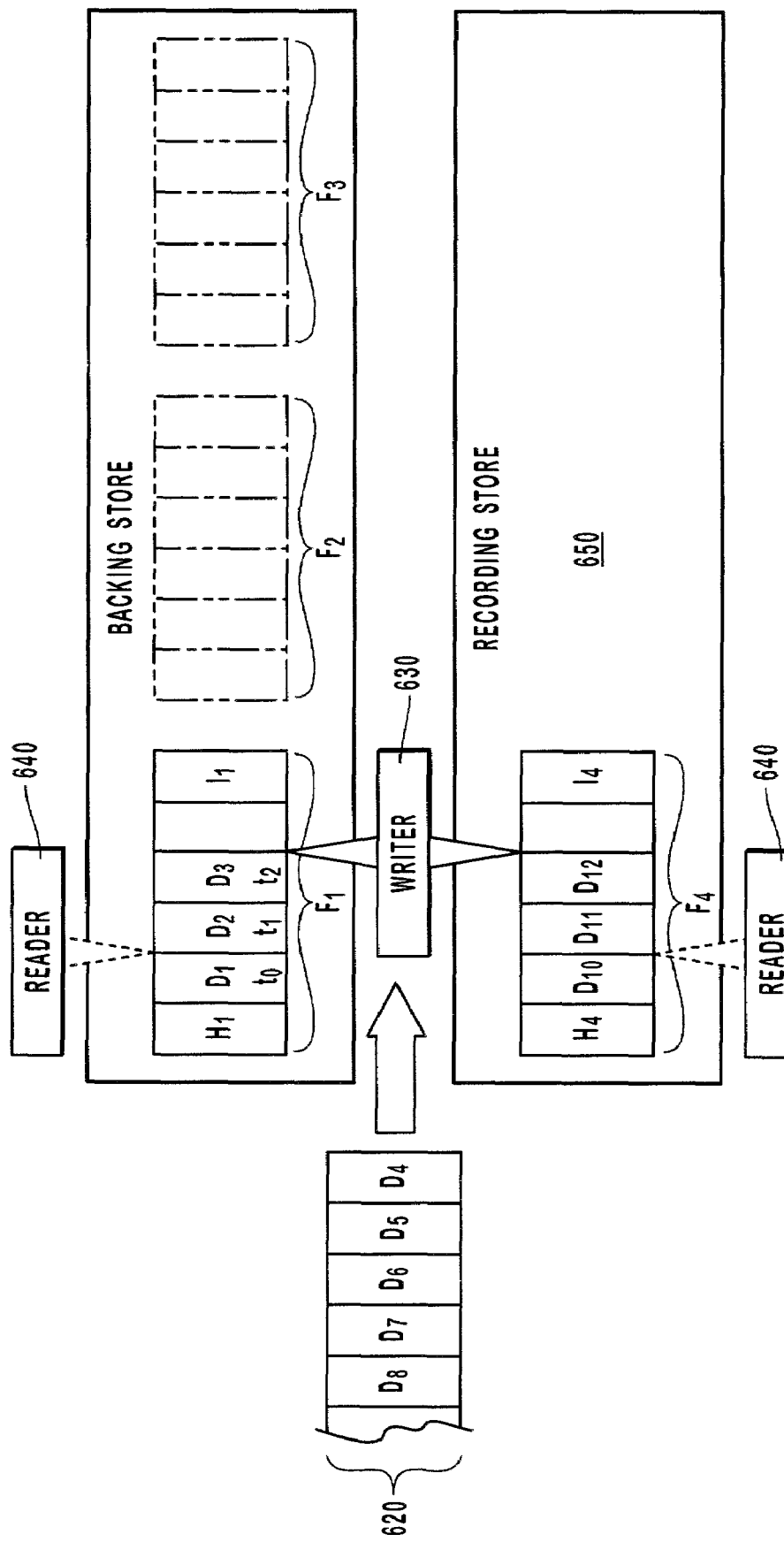
FIG. 6 illustrates one embodiment of the storage medium of the programmable video recorder that includes a backing store having three discrete temporary files and a recording store configured to store data samples of streamed data.

FIG. 6 illustrates one embodiment in which the PVR store comprises a backing store having three temporary files F1, F2 and F3, each of which is configured to store a duration of ten minutes worth of streamed data content, such that the backing store is able to store or buffer a total duration of thirty minutes worth of content.

Upon creating the backing store, the PVR is ready to receive and store streamed data. Streamed data generally includes a plurality of data samples that have been streamed together by an appropriate format which enables each of the data samples to be accessed and rendered without first receiving the entire file contents of the streamed data to which the data sample pertains. According to one embodiment, the data samples can be encoded in both non-byte stream formats, such as AVI and ASF, and byte stream formats, such as MPEG-2.

Upon receiving the streamed data (act 520) the PVR determines where the streamed data is to be written (step 530). The corresponding acts of step 530, for determining where the streamed data is to be written, will now be described. Initially, each data sample is assigned a time stamp as the data sample is received (act 546). By assigning time stamps to the data samples it is possible to later access the data samples based on their assigned time stamps, rather than having to approximate the location of the data samples based upon the byte size of the temporary file.

As illustrated in FIG. 5, the present method also includes the act of opening a new file that is configured to store the data sample. The new file may either be a temporary file in the backing store (act 548) or a permanent file in the recording store. The act of opening a new temporary file is described below, with reference to acts 552 and 558. Although not illustrated in FIG. 5, it will be appreciated that the act of opening and configuring a new permanent file may occur at anytime and is typically performed upon external input, for example, when the user instructs the PVR to record a program.

Configuring a file to store the new data sample (as shown by act 548 in the figure for temporary files) at least includes assigning a duration of content to the new file that corresponds with the time stamp assigned to the data samples stored in that file. For temporary files, the duration of the new temporary file will be configured to at least include the time stamp assigned to the first data sample stored in the temporary file. Configuring the file to store the new data sample also includes the creation of a header and an index for the file. The header generally describes the content and formatting of the data samples and the index generally comprises an index of the stored data samples and their corresponding time stamps so that the data samples can be accessed at a later time, as desired.

The next act of the invention generally includes determining whether any existing file is suitably configured to store the new data sample (act 550). According to one embodiment, it is determined a file is suitably configured to store a data sample only when the data sample has a time stamp that corresponds with the duration of content assigned to the file. For example, according to the embodiment illustrated in FIG. 6, the first temporary file F1 is configured to store the first ten minutes of content, such that it will be appropriately configured to store all of the data samples having time stamps that correspond with the first ten minutes of content in the data stream 620. As shown, data samples D1, D2, and D3 are each assigned time stamps t0, t1 and t2, respectively, which correspond with the duration of content assigned to file F1 (e.g. the first ten minutes of content). Accordingly, data samples D1, D2, and D3 are each written to file F1 (act 553). It will be appreciated that although file F1 is described as a first temporary file, act 553 also applies to permanent files and to subsequent files as well.

When the time stamp of a new data sample does not correspond with the duration of content assigned to an open temporary or permanent file, it may next be determined whether the total number of permitted temporary files have been opened (act 552). In the present example, only one of the three permitted files have been opened, namely file F1. Accordingly, the total number of permitted files have not been opened. Therefore, the method further includes the act of opening a new one of the permitted temporary files (act 548), as generally described above.

Once the data samples D1, D2 and D3 have been written to the backing store they can be accessed and read by reader 640 in any manner specified by the viewer. Reading of data samples can even occur while new data samples are being written to the backing store. It will be appreciated that in this manner the PVR provides a significant advantage over the traditional VCR.

Figure 1:
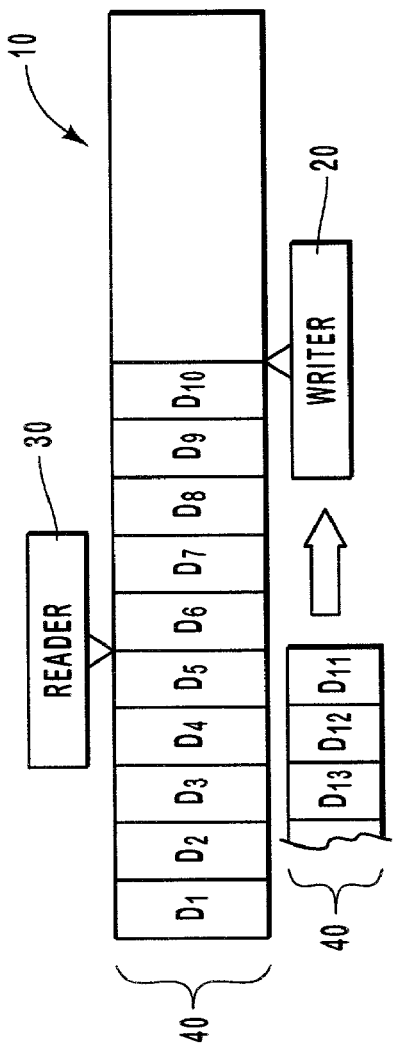
FIG. 1 illustrates a prior art ring buffer.
Figure 2:
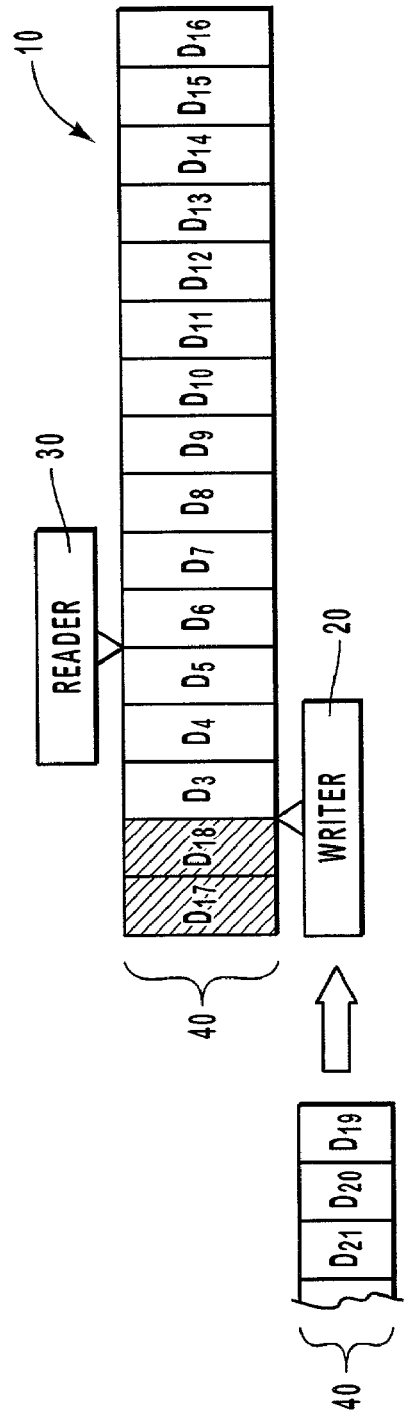
FIG. 2 illustrates the ring buffer of FIG. 1 in which new data samples overwrite the oldest data samples.
Figure 7:
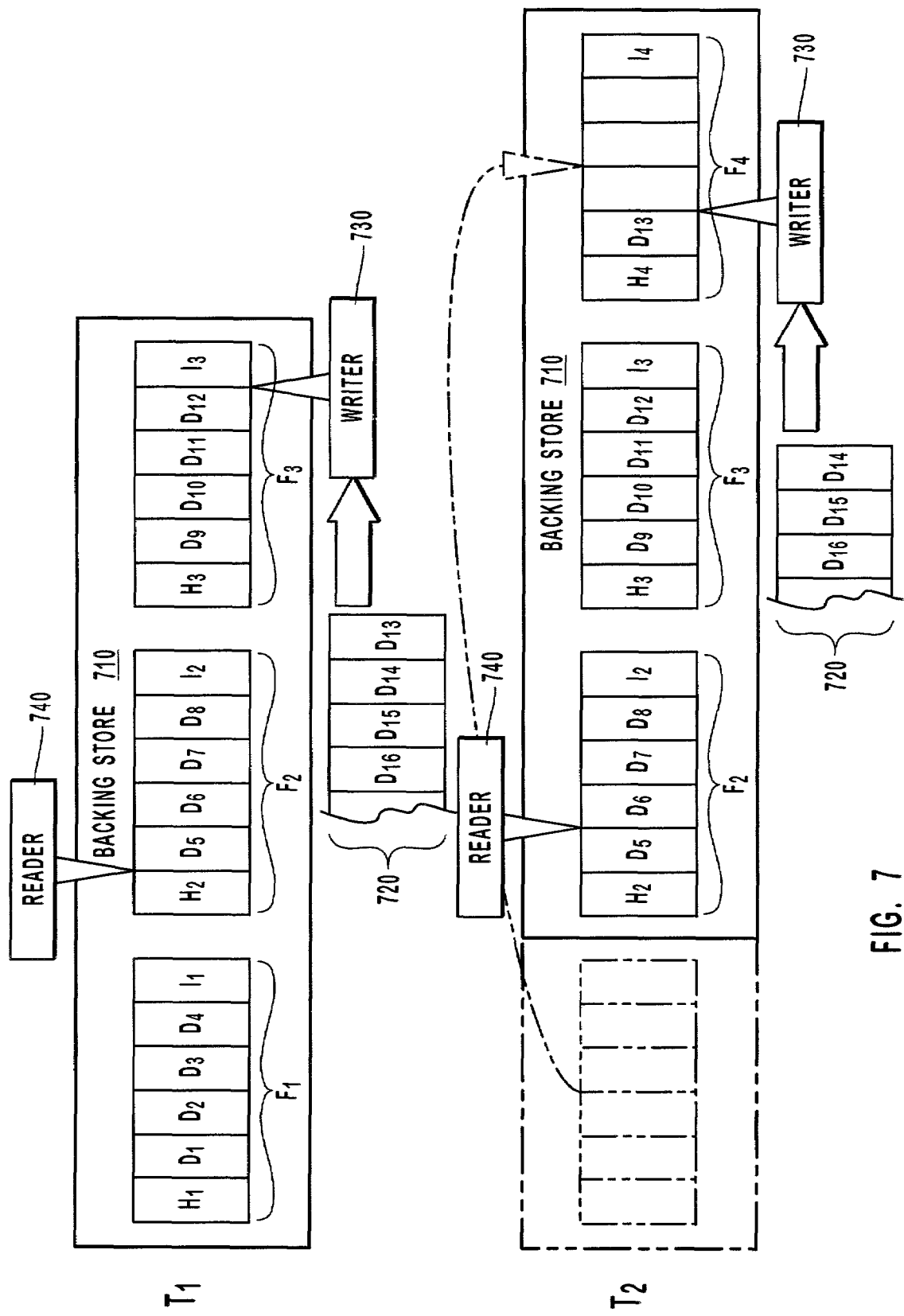
FIG. 7 illustrates one embodiment of the storage medium of the programmable video recorder that includes a backing store having three discrete temporary files that are completely filled at a first time T1 and that shows the backing store at a second time T2 in which a new temporary file overwrites the oldest temporary file.

The backing store and methods of the invention will now be described with specific reference to embodiments in which the backing store is completely filled. For example, as shown in FIG. 7, all three files F1, F2 and F3 of the backing store 710 are completely filled, such that when writer 730 receives the next data sample D13 from the data stream 720, the data sample D13 must either be written to the backing store 710 or it will be lost. A typical ring buffer 10, illustrated in FIGS. 1 and 2, simply wraps around and overwrites the oldest data sample in the ring buffer 10. This, however, is not possible with non-byte streamed data, as described above, because non-byte streamed data does not support wrapping. In particular, if the writer 730 of FIG. 7 were to simply overwrite the header H1 or data sample D1 of file F1, which are the oldest data blocks in the backing store 710, then all of the data within file F1 would be corrupted and inaccessible, thereby wiping out the ten minutes of stored content in file F1. This, by itself is not a critical problem inasmuch as data samples D1, D2, D3 and D4 have already been read by the reader 740, which is now positioned to read data sample D5. The real problem occurs when data sample D13 and all subsequently stored data samples cannot be accessed by the reader 740 because they are not properly indexed in files having appropriate headers and indexes required for interpreting and finding the data samples. It will also be appreciated by those of ordinary skill in the art that data sample D13, all other data samples written to F1 (D2, D3, and so forth), as well as all subsequently stored data samples may also be made inaccessible, even if the header H1 is left intact, when data sample D1 is overwritten.

Accordingly, instead of overwriting each data block in the backing store on an incremental basis, which is done with existing ring buffers, the present invention operates under a moving window paradigm in which the data within the oldest temporary file F1 is reformatted, replaced, or overwritten with a new temporary file that is configured to store the new data samples (act 554). For example, file F1 at time T1 contains header H1, data samples D1, D2, D3 and D4, and index I1. However, at time T2, file F1 is overwritten or otherwise reformatted with a new file F4 that is properly configured for storing newly received data sample D13. In particular, file F4 is configured with an appropriate new header H4 and a new index I4 and is also assigned an appropriate duration of streamed content to store, which corresponds at least to the time stamp of data sample D13, thereby enabling data sample D13 to be accessed by the reader 740 at a later time. It will be appreciated that in this manner, the method of the invention essentially creates a moving window in the backing store that discards the oldest file F1 to accommodate the newest file F4.

The example provided above, in reference to FIG. 7 is particularly suited for circumstances in which the reader 740 is not reading from the file that is being discarded. When the reader is reading from a temporary file that is about to be overwritten, invalidated or otherwise discarded by a new temporary file, the method of the invention may include additional acts for reducing any disruption caused to the reading of the stored data.

Figure 8:
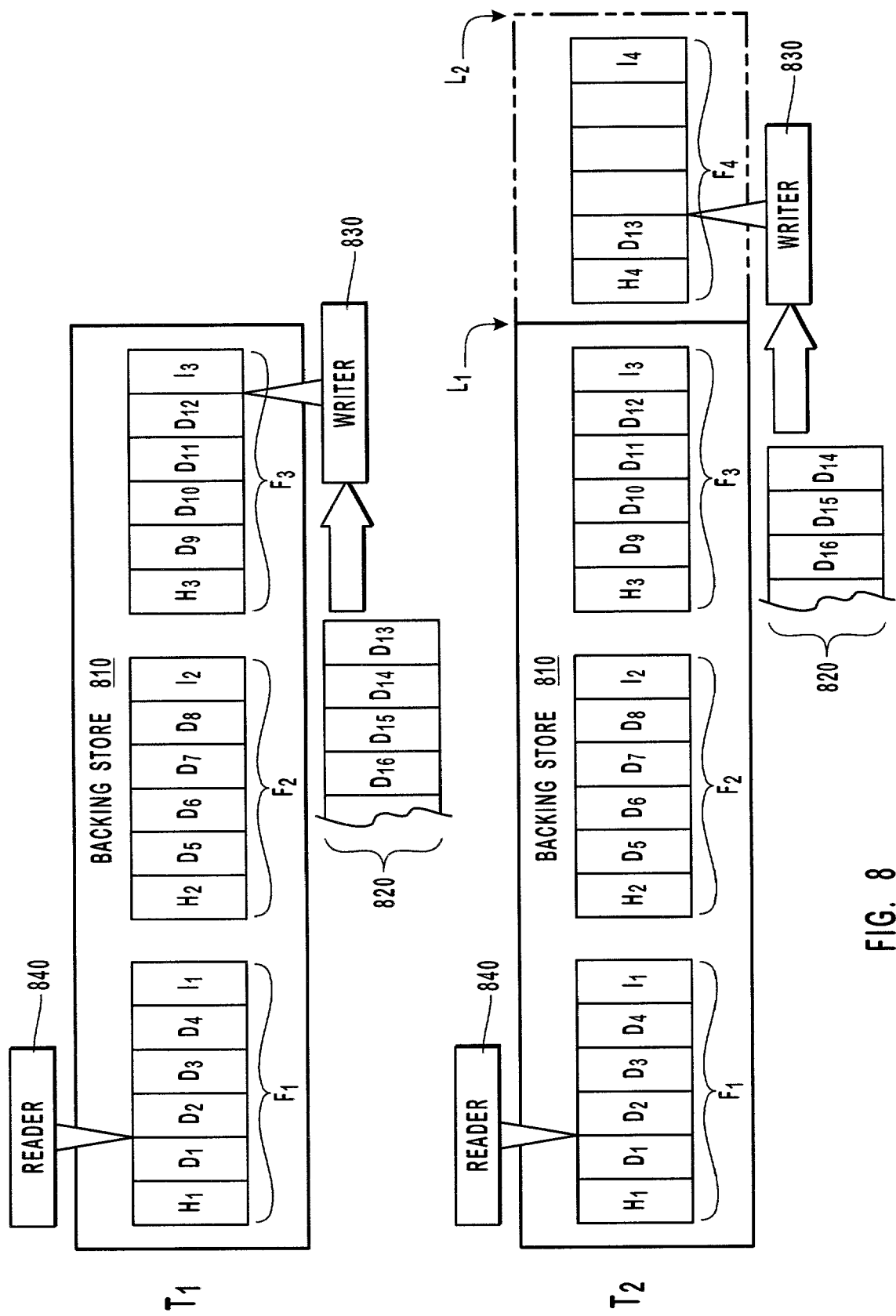
FIG. 8 illustrates one embodiment of the storage medium of the programmable video recorder that includes a backing store in which the backing store is expanded to accommodate that the reader is still reading from the oldest temporary file.

FIG. 8 illustrates one embodiment in which the backing store 810 is full and new data samples from the data stream 820 must either be written to the backing store or they will be lost. However, as shown, the reader 840 is currently reading from a file F1, such that if file F1 is overwritten (i.e., removed from the moving window) then all of the data contained within file F1 will be lost and inaccessible to the reader. Nevertheless, data sample D13, for example, must either be written to the backing store 810 when it is received by the writer 830, or the data sample D13 will be lost and inaccessible to the reader 840.

To avoid inadvertently overwriting a temporary file that is being read by the reader 840, it is desirable to determine whether a reader is reading from the oldest temporary file (act 556) and whether any additional memory can be allocated to the backing store (act 558). If it is determined that the reader is reading from the oldest temporary file (act 556) and that more memory can be allocated to the backing store (act 558), then a new temporary file is opened within the backing store (act 548).

FIG. 8 illustrates an embodiment in which additional memory is allocated to the backing store 810 at time T2 and data sample D13 is written into a new temporary file F4 created within the additional memory of the backing store 810, thereby preventing file F1 from being overwritten. It will be appreciated that this enables the reader 840 to continue reading from file F1 without interruption. In one embodiment, the backing store 810 is provided a lower capacity limit L1 and an upper capacity limit L2, such that new memory can be allocated to the backing store with an upper capacity limit L2 if and only if the reader 840 is reading from the oldest temporary file F1 and the backing store has fewer than L2 temporary files. In another embodiment, an external policy agent that operates under preconfigured policies established at manufacture or a later time is consulted to determine whether to add more memory to the PVR store and how much more memory should be added. By way of example, and not limitation, a viewer may also be consulted prior to allocating any memory to the PVR store.

When the reader is not reading from the oldest temporary file, the backing store 810 is limited to the lower capacity limit L1. For instance, if the reader were reading from file F2 then the writer would simply overwrite file F1, as described above in reference to FIG. 7, rather than creating a new file F4 in addition to file F1.

If it is determined that the reader 840 is still reading from the oldest file in the backing store when a new file must be created (act 558), the method of the invention may be executed in one of three ways. In the first way, when the data samples are non-byte streamed data samples, such as ASF data samples, the reader 840 is forced to advance to read from another temporary file (act 560), and the oldest temporary file is overwritten (act 554). This way, the most recently received data will be stored. The method of the invention can also include acts for notifying the reader and the viewer whenever a temporary file is about to be overwritten that is being read by the reader. This can be useful for enabling the reader to be advanced prior to overwriting the temporary file. The reader may also be notified whenever a file is actually overwritten, thereby enabling the reader to advance to a new file.

In a second way, not shown, new data samples are written to files that are created in the recording store associated with the backing store so as to effectively extend the window or capacity of the backing store. For example, as illustrated in FIG. 6, the writer 630 can write streamed data to a temporary file F4 that is a permanent archive file. This is particularly useful when a viewer is watching a program from the backing store with reader 640 but the viewer also wishes to record another program that will begin before the viewer has completed watching the first program. In this embodiment, the invention generally provides for seamless recording inasmuch as the writer 630 can begin to write the second program to the recording store 650 at the viewer's instruction and without interrupting the writing of data samples to the temporary files of the backing store. Essentially, this is an effective method for expanding the storage capacity of the PVR.

Figure 9:
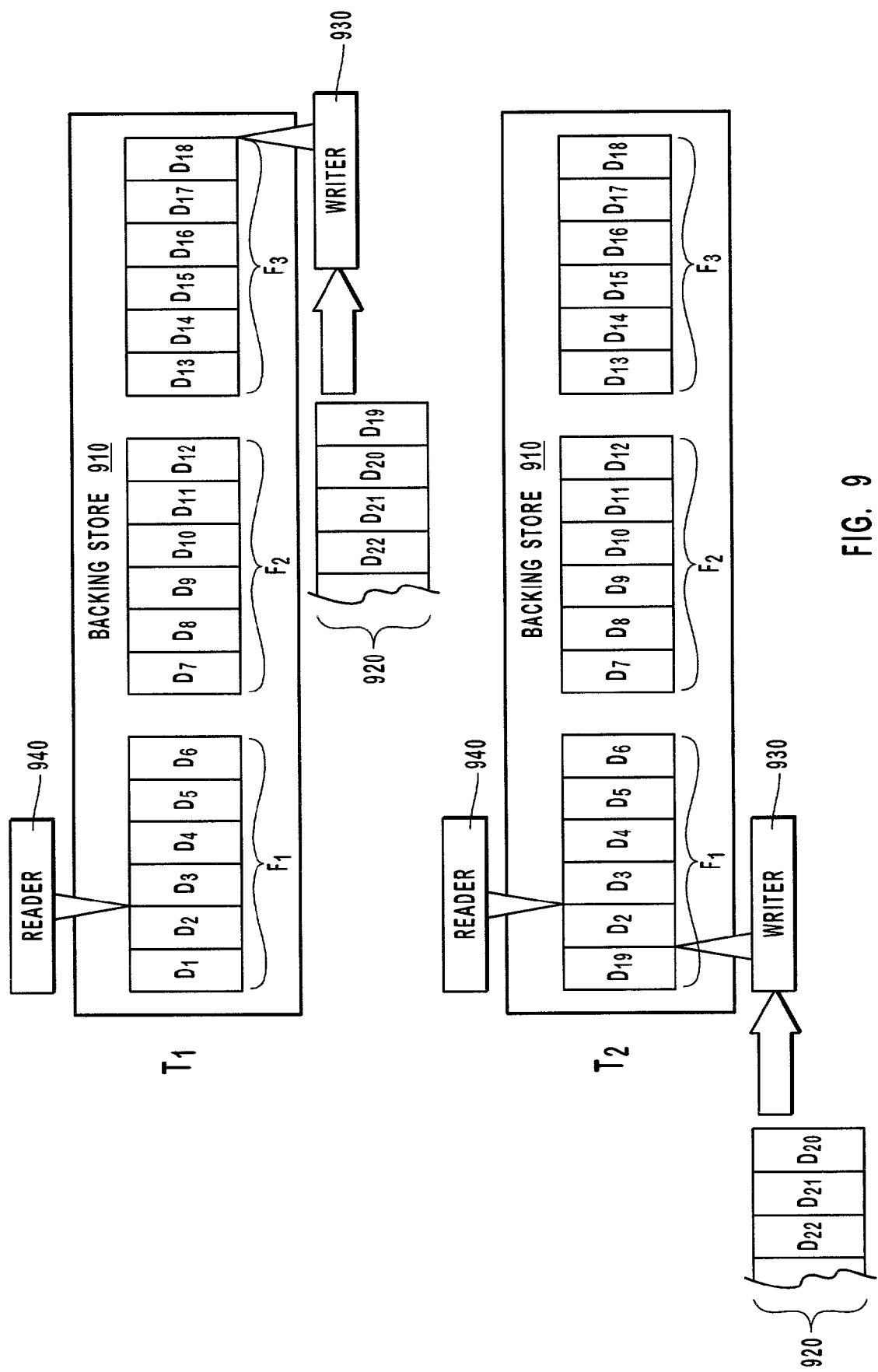
FIG. 9 illustrates one embodiment of the storage medium of the programmable video recorder that includes a backing store having three discrete temporary files that are completely filled at a first time T1 and that shows the backing store at a second time T2 in which new byte-streamed data samples overwrite the oldest existing data samples.

The third way, which will now be described, is useful when the data samples comprise byte stream data samples, such as MPEG samples. In this embodiment, each of the temporary files is configured to function as a mini-ring buffer, such that the most recently received data sample will overwrite the oldest data sample (act 562). This is illustrated in FIG. 9. As shown, streamed data 920 comprising MPEG-2 data is written to the backing store 910 at time T1, until there is no room left to store additional data. At time T2, the writer 930 overwrites the oldest data sample D1 with the newest data sample D19.

In this embodiment, the temporary files F1, F2 and F3 do not include headers and indexes, such that there is no risk of corrupting the data in the oldest temporary file when the oldest data block is overwritten, so the reader 940 will be unaffected by the writing of the new data. However, it will be appreciated that the temporary files can be configured with headers and indexes even if they are not used by the MPEG data samples. When headers and indexes are used in this embodiment, the new data samples only overwrite the oldest data samples rather than overwriting the headers and the indexes. The headers and the indexes may, however be updated as required to correctly identify and index the data samples stored therein.

Although in this embodiment the backing store 910 appears similar to the traditional ring buffer. It will be appreciated that the backing store of the present embodiment provides a significant advantage over the traditional ring buffer. In particular, at any time the writer may begin to receive new data comprising non-byte formatted streamed data the temporary files F1, F2 and F3 can be overwritten with new temporary files that are appropriately configured to accommodate the non-byte streamed data, whereas the traditional ring buffer does not provide this convenience. In other words, the present backing store is able to wrap byte streamed data formats, while at the same time having the flexibility to also store non-byte streamed data formats.

Figure 10:
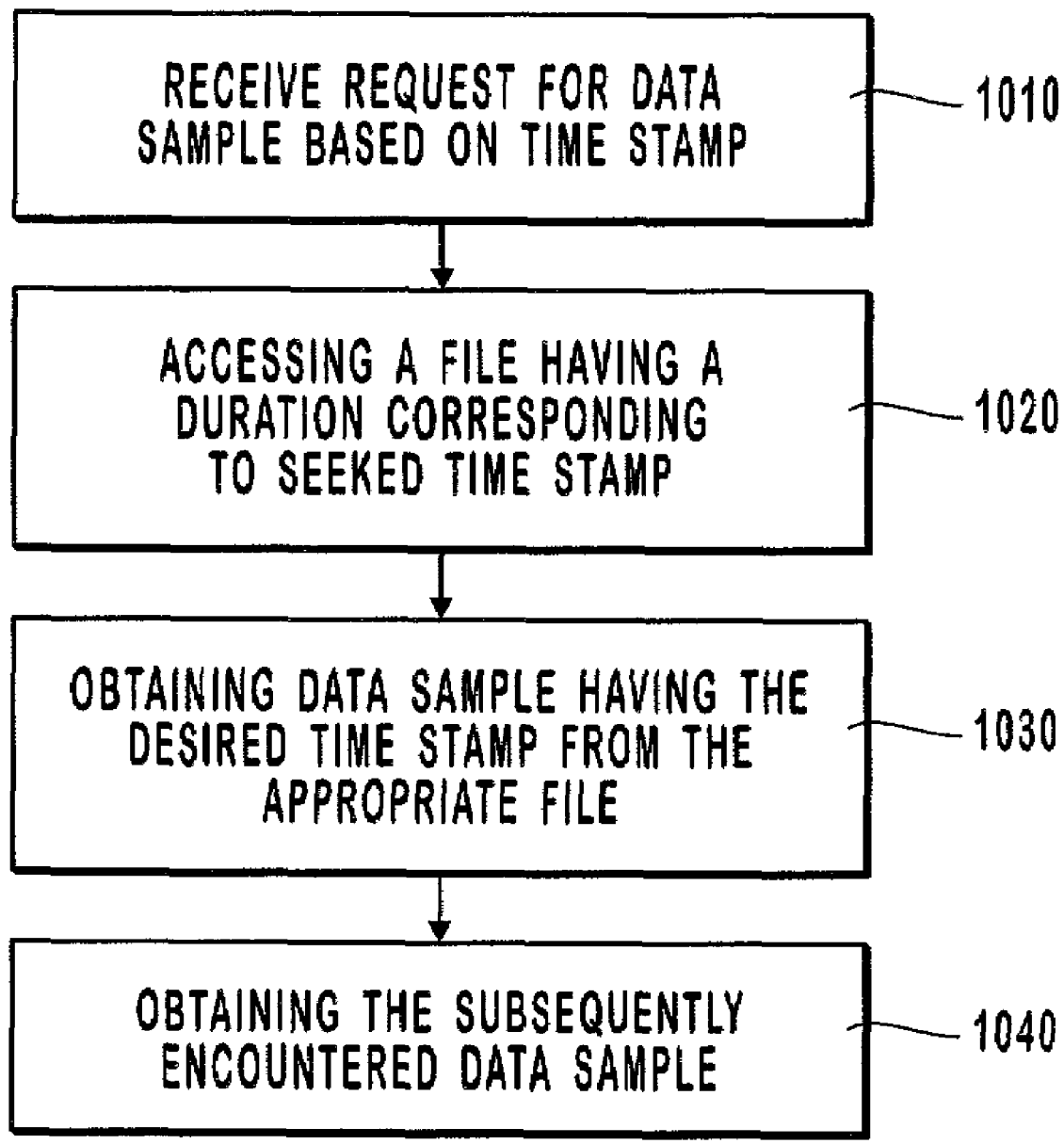
FIG. 10 illustrates a flowchart of a method for obtaining desired data samples from the storage medium based on time stamps assigned to the data samples.

As mentioned above, once the data samples are written to the backing store and the recording store they can be accessed by the reader. FIG. 10 illustrates one suitable method for reading the data samples from the storage medium of the PVR. Initially, a request for a desired data sample is received based on a particular time associated with the data sample (act 1010). Next, the appropriate file containing the duration of content associated with the time stamp of the desired data sample is obtained (act 1020). This can be accomplished for example because each of the files is assigned a duration rather than a file byte size. It will be appreciated that the appropriate file can be obtained from either the backing store or the recording store. Next, the appropriate data sample having the desired time stamp is obtained (act 1030). This can be accomplished for example by reviewing the contents of the indexes from the selected files.

It will be appreciated that according to this method, the desired data can be obtained because it is associated with a time stamp that is indexed by the file it is contained in. It will also be appreciated that this is an improvement over the prior art in which desired data is obtained after approximating the location of the desired data based on the byte size of the file and the approximate byte size of the interval of content that must be skipped over to obtain the desired data.

After the desired data sample is read, the reader continues to read each subsequent data sample that is encountered by the reader, until otherwise instructed by the viewer (act 1040). Transitioning to the next file is accomplished by the storage medium 440 and is transparent to the reader. Accordingly, when the reader gets to the end of a file, it has nothing special to do, the next sample is simply retrieved from the following file.

In summary, the present invention provides a method for enabling the PVR to store non-byte stream formatted data, such as ASF data, in addition to byte stream formatted data, such as MPEG. The invention also enables the data, which is stored within the backing store, to be quickly and precisely accessed because it is indexed and stored by time stamp. Accordingly, it will be appreciated that for at least these reasons, the methods and systems of the present invention are an improvement over the prior art PVR devices and corresponding methods for storing streamed data in a ring buffer.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method implemented in a computing system that receives streamed data comprising data samples from a streamed data source, and wherein the computing system includes a buffering store for temporarily storing the streamed data as it is received, and which is independent of a recording store configured to persistently store the streamed data upon receiving a record command from a user, the method, configuring and using the temporary buffering store to store the streamed data as it is received, wherein the method comprises:
   prior to receiving the streamed data, specifying a total duration of content the buffering store is configured to temporarily store;
   configuring the buffering store to include a plurality of separately identifiable files for storing the content;
   prior to receiving the streamed data, specifying, for each of the plurality of files, a duration of the content each of the plurality of files in the buffering store is permitted to hold, rather than specifying the size of each file in terms of byte size, wherein the duration of content that each of the plurality of files is configured to hold is substantially the same for each of the plurality of files;
   as streamed data is received, writing data samples of the streamed data into a first file of the buffering store until the duration of the first file is reached and then writing additional data samples to each subsequent file in the buffering store, one file at a time, until the duration of each subsequent file is reached; and
   once the duration of each file in the buffering store is reached, removing data samples written to the first file of the buffering store and replacing the removed data samples with newly received data samples of the streamed data.

2. A method as recited in claim 1, wherein the streamed data comprises byte stream formatted data.

3. A method as recited in claim 1, wherein the streamed data is ASF formatted.

4. A method as recited in claim 1, wherein the streamed data includes data samples encoded by an MPEG format.

5. A method as recited in claim 1, wherein the files of the buffering store are formatted in a byte stream format.

6. A method as recited in claim 1, wherein the files of the buffering store are formatted in an ASF format.

7. A method as recited in claim 1, wherein the act of specifying a duration of the streamed data to each file includes the act of assigning sequential durations of content each of the files is permitted to hold.

8. A method as recited in claim 1, wherein the number of files is a predetermined default number of files.

9. A method as recited in claim 8, wherein the number of files is changed by at least one of user input and a policy agent.

10. A method as recited in claim 1, wherein the number of files changes dynamically to accommodate newly received streamed data.

11. A method as recited in claim 1, wherein the duration of streamed data content each file is permitted to hold changes according to at least one of user input and a policy agent.

12. A method as recited in claim 1, wherein prior to writing data samples into a first file, the method includes the act of assigning a time stamp to each of the data samples and the act of determining the time stamp assigned to each of the data samples corresponds to the duration specified for the first file.

13. A method as recited in claim 1, wherein the act of removing any data samples written to the first file includes overwriting the first file, and wherein the first file is a temporary file.

14. A method as recited in claim 1, wherein the act of removing any data samples written to the first file includes invalidating the first file and creating a new file to take its place in the window.

15. A method as recited in claim 1, including the act of expanding the buffering store to include at least one file in a recording store, and including the act of writing at least some of the streamed data to the file in the recording store.

16. A method as recited in claim 1, further including the act of creating a notice whenever the data samples are either removed or about to be removed and a reader associated with the computing system is reading from a file containing the data samples.

17. A method as recited in claim 16, further including the act of advancing the reader to read from another file whenever the data samples are about to be removed from the file the reader is reading.

18. A method as recited in claim 1, wherein the computing system includes a reader configured to access and read the data samples from the buffering store, and wherein the method further includes the act of accessing at least one data sample from the first file with the reader based on a time stamp assigned to the data sample.

19. A method as recited in claim 1, wherein the number of files includes more than one file.

20. A method as recited in claim 1, wherein each of the number of files is a temporary file.

21. A method as recited in claim 1, wherein the buffering store includes a backing store configured to store temporary files.

22. A method as recited in claim 21, wherein the buffering store includes a recording store configured to store permanent files.

23. A computer-readable storage media storing computer-executable instructions for implementing a method in a computing system that receives streamed data comprising data samples from a streamed data source, and wherein the computing system includes a buffering store for temporarily storing the streamed data as it is received, and which is independent of a recording store configured to persistently store the streamed data upon receiving a record command from a user, the method configuring and using the temporary buffering store to store the streamed data as it is received, the method further comprising:
  prior to receiving the streamed data, specifying a total duration of content the buffering store is configured to temporarily store;
  configuring the buffering store to include a plurality of separately identifiable files for storing the content;
  prior to receiving the streamed data, specifying, for each of the plurality of files, a duration of the content each of the plurality of files in the buffering store is permitted to hold, rather than specifying the size of each file in terms of byte size, wherein the duration of content that each of the plurality of files is configured to hold is substantially the same for each of the plurality of files;
  as streamed data is received, writing data samples of the streamed data into a first file of the buffering store until the duration of the first file is reached and then writing additional data samples to each subsequent file in the buffering store, one file at a time, until the duration of each subsequent file is reached; and
  once the duration of each file in the buffering store is reached, removing data samples written to the first file of the buffering store and replacing the removed data samples with newly received data samples of the streamed data.

24. The computer-readable storage media as recited in claim 23, wherein the one or more computer-readable media include system memory.

25. The computer-readable storage media as recited in claim 23, wherein the streamed data comprises at least one of ASF streamed data and MPEG data.

26. The computer-readable storage media as recited in claim 23, wherein each of the files is formatted in a non-byte stream format.

27. The computer-readable storage media as recited in claim 23, wherein the method further includes the act of removing any data samples written to the first temporary file includes the act of overwriting the first temporary file with a new temporary file.

28. A method as recited in claim 1, wherein the buffering store further includes a recording store configured to store permanent files.

29. A method as recited in claim 28, wherein the total number of files is at least two, and wherein at least one file is a temporary file.

30. A method as recited in claim 29, wherein the streamed data is formatted in a non-byte steam format.

31. A method as recited in claim 30, wherein the streamed data includes ASF formatted data.

32. A method as recited in claim 28, wherein each file is formatted in a non-byte stream format.

33. A method as recited in claim 28, wherein the duration of each file is at least 5 minutes.

34. A method as recited in claim 28, wherein the duration of each file is 10 minutes.

35. A method as recited in claim 1, wherein replacing the removed data samples includes replacing the first file with a new file in the buffering store and wherein removing data samples written to the first file includes removing all data samples written to the first file.

36. A method as recited in claim 1, wherein replacing the removed data samples includes replacing only some of the data samples written to the first file with the newly received data samples.

37. A method as recited in claim 1, wherein replacing the removed data samples occurs only after first adding a new temporary file to the buffering store that causes the buffering store to exceed the total duration of content specified for the buffering store, and only after first writing new data samples to the new temporary file.

38. A method as recited in claim 37, wherein the new temporary file is only created upon determining that a reader is reading the first file at a time when the duration of each file in the buffering store is reached.

39. A method as recited in claim 1, wherein the method further includes, upon receiving a record command from a user, recording at least some of the received data samples to a separate recording store.

40. A method implemented in a computing system that receives streamed data comprising data samples from a streamed data source, and wherein the computing system includes a buffering store for temporarily storing the streamed data as it is received, and which is independent of a recording store configured to persistently store the streamed data upon receiving a record command from a user, the method, configuring and using the temporary buffering store to store the streamed data as it is received, wherein the method comprises:
  prior to receiving the streamed data, specifying a total number of files to be used in the buffering store, the total number of files comprising a plurality of files;
  specifying, for each of the plurality of files, a duration of the streamed data content each file of the plurality of files in the buffering store is permitted to hold, rather than specifying the size of each file in terms of byte size, the duration of the streamed data content that each file of the plurality of files is configured to hold being substantially the same and being received prior to the receipt of the streamed data;
  as the streamed data is received and until the duration of each file the buffering store is permitted to hold is reached, iteratively performing the acts of:
    assigning a time stamp to a new data sample of the streamed data;
    upon determining the time stamp of the new data sample corresponds to the duration of an existing file that is not being read by the reader, writing the data sample to said existing and corresponding file; and
    upon determining that the time stamp of the new data sample does not correspond to a duration of any existing file in the buffering store, and upon determining the total number of files existing in the buffering store is less than the specified total number of files, opening a new file in the buffering store and specifying a duration of the streamed data content the file is permitted to hold and which corresponds with the time stamp assigned to the new data sample; and
  wherein once the specified duration of each of the total number of files specified in the buffering store is reached, iteratively performing the acts of:
    upon determining the reader is not reading from an oldest temporary file in the backing store, overwriting an oldest temporary file with a new temporary file having a specified duration of the streamed data content the new temporary file is permitted to hold and which corresponds with the time stamp assigned to the new data sample; and writing the data sample to the new temporary file.

41. A method as recited in claim 40, wherein upon determining the reader is reading from the oldest temporary file in the buffering store and that the specified duration of each of the total number of files specified in the buffering store is reached, the method further includes the acts of:

determining that additional memory from the storage medium can be allocated to the backing store;

opening a new temporary file in the backing store;

specifying the duration of the streamed data content the new temporary file is permitted to hold and which corresponds with the time stamp assigned to the new data sample, rather than specifying the size of the new temporary file in terms of byte size; and writing the new data sample to the new temporary file.

42. A method as recited in claim 41, wherein the determination that additional memory from the storage medium can be allocated to the buffering store is derived from at least one of a predetermined size of the buffering store and an external policy agent.

43. A method as recited in claim 41, wherein upon determining the reader is reading from the oldest temporary file in the buffering store and that the specified duration of each of the total number of files specified in the buffering store is reached, and wherein the streamed data is encoded in a non-byte stream format, the method further includes the acts of:

determining that additional memory from the storage medium cannot be allocated to the buffering store;

advancing the reader to read from another file in the buffering store; and overwriting the oldest temporary file with a new temporary file; and writing the new data sample to the new temporary file.

44. A method as recited in claim 40, wherein the streamed data includes non-byte streamed data samples.

45. A method as recited in claim 40, wherein each file in the buffering store is formatted in a non-byte stream format.

46. A method as recited in claim 40, wherein upon determining the reader is reading from the oldest temporary file in the buffering store and that the specified duration of each of the total number of files specified in the buffering store is reached, and wherein the file format of each file in the buffering store is encoded in a byte stream format, the method further includes the acts of:

determining that additional memory from the storage medium cannot be allocated to the buffering store; and upon determining that the reader is not reading from an oldest data sample in the oldest temporary file, overwriting the oldest data sample in the oldest temporary file with the new data sample.

47. A method as recited in claim 46, wherein the streamed data includes data samples encoded by an MPEG format.

* * * * *